(12) United States Patent
Bleyer

(10) Patent No.: US 9,830,833 B2
(45) Date of Patent: Nov. 28, 2017

(54) AUTOMATION UNIT, METHOD FOR VIRTUAL FUNCTIONAL INTERLINKING OF EXTERNAL COMPONENTS AND COMPUTER PROGRAM PRODUCT

(71) Applicant: FESTO Didactic GmbH & Co. KG, Denkendorf (DE)

(72) Inventor: Jurgen Bleyer, Heiningen (DE)

(73) Assignee: FESTO DIDACTIC SE, Denkendorf (DE)

( * ) Notice: Subject to any disclaimer, the term of this patent is extended or adjusted under 35 U.S.C. 154(b) by 201 days.

(21) Appl. No.: 14/646,815

(22) PCT Filed: Nov. 28, 2012

(86) PCT No.: PCT/EP2012/004903
§ 371 (c)(1),
(2) Date: May 22, 2015

(87) PCT Pub. No.: WO2014/082647
PCT Pub. Date: Jun. 5, 2014

(65) Prior Publication Data
US 2015/0302765 A1    Oct. 22, 2015

(51) Int. Cl.
*G09B 19/00* (2006.01)
*G09B 23/00* (2006.01)
*G09B 23/06* (2006.01)
*G05B 15/02* (2006.01)
*G09B 9/00* (2006.01)

(52) U.S. Cl.
CPC ........... *G09B 19/003* (2013.01); *G05B 15/02* (2013.01); *G09B 9/00* (2013.01); *G09B 23/00* (2013.01); *G09B 23/06* (2013.01)

(58) Field of Classification Search
CPC .................................................... G09B 19/003
USPC ........................................................ 434/219
See application file for complete search history.

(56) References Cited

U.S. PATENT DOCUMENTS

2010/0297595 A1* 11/2010 Schietinger .......... G09B 25/025
434/301

FOREIGN PATENT DOCUMENTS

| DE | 102008051401 | 4/2010 |
| DE | 202012001359 | 3/2012 |

* cited by examiner

*Primary Examiner* — Thomas Hong
(74) *Attorney, Agent, or Firm* — Hoffmann & Baron, LLP

(57) ABSTRACT

An automation unit for training purposes, with a computer, including an arithmetic and logic unit, a computer housing, a data interface and a screen, wherein the arithmetic and logic unit, the data interface and the screen are accommodated in the computer housing. At least one operating module is provided, which includes a module casing on which is formed a connection device for electrical and/or fluidic connection to an external component and in which a processing unit for the processing of electrical signals of the computer and/or the external components is accommodated, wherein the operating module is designed for location in a working position adjacent to the screen and for signal communication with the arithmetic and logic unit via a wireless and/or wired signal path which runs over the data interface.

11 Claims, 3 Drawing Sheets

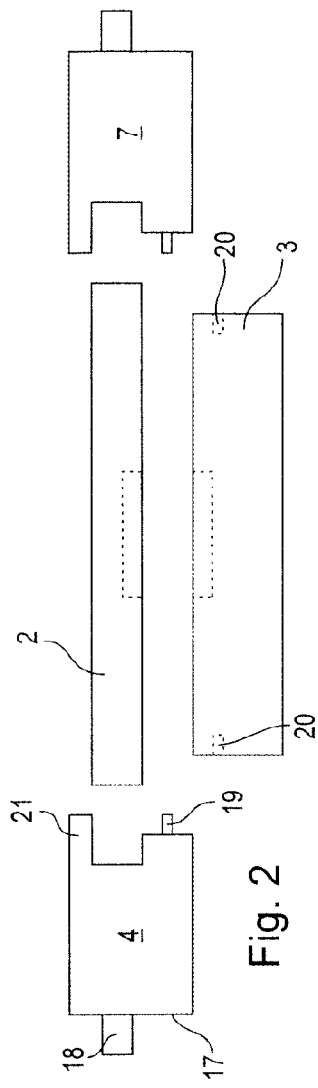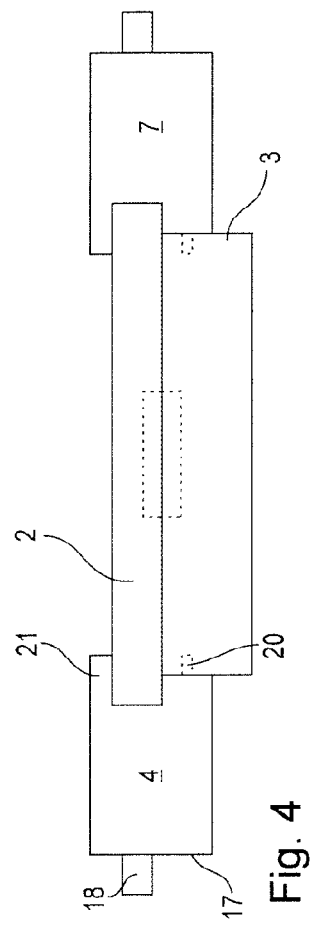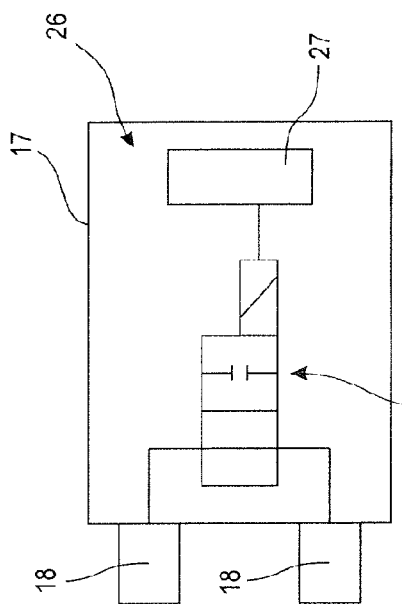

AUTOMATION UNIT, METHOD FOR VIRTUAL FUNCTIONAL INTERLINKING OF EXTERNAL COMPONENTS AND COMPUTER PROGRAM PRODUCT

This application claims priority based on an International Application filed under the Patent Cooperation Treaty, PCT/EP2012/004903, filed Nov. 28, 2012.

BACKGROUND OF THE INVENTION

The invention relates to an automation unit with a computer, comprising an arithmetic and logic unit, a computer housing, a data interface and a screen, wherein the arithmetic and logic unit, the data interface and the screen are accommodated in the computer housing. Such an automation unit may be used for example for training purposes, in particular in industrial training, in order to familiarise the trainees in dealing with components of the automation system such as actuators, sensors, control units, regulators and other automation devices, or in the operation of an automated system in a production or manufacturing facility. The invention also relates to a method for the virtual, functional interlinking of external components and to a computer program product.

Known from DE 10 2008 051 401 A1 is a training and simulation unit for electrical function sequences in electrical, electro-mechanical and electro-fluidic systems, in which a controller is provided for simulation and virtual reproduction of system components on a display, with electrical connections to cable connections with hardware components of the system located next to the display. In each case at least some of the connections are assigned optical inputs and/or outputs of the respective simulated system components on the display, and the controller has means of generating suitable electrical voltages at the connections of assigned outputs of the simulated system components and/or of generating reactions of the simulated system components depending on externally applied voltages at connections which are assigned to the inputs of the simulated system components.

SUMMARY OF THE INVENTION

The problem of the invention is to provide an automation unit, a method for the virtual functional interlinking of external components, and a computer program, which may be adapted easily to different training tasks.

This problem is solved according to a first aspect, for an automation unit of the type described above, by the features of claim 1. Here there is provided an operating module which includes a module casing on which is formed a connection device for electrical and/or fluidic connection to an external component and in which a processing unit for the processing of electrical signals of the computer and/or the external components is accommodated, wherein the operating module is designed for location in a working position adjacent to the screen and for signal communication with the arithmetic and logic unit via a wireless and/or wired signal path which runs over the data interface.

The operating module is designed for connection to the computer of one or more external components and has for this purpose a processing unit which is adapted to the respective component or components to be connected, so as to be able to process signals from the components and/or to provide the signals and/or fluid flows required for functioning of the components. The geometry of the operating module is such that it may be mounted in a working position adjacent to the computer screen. This ensures a compact arrangement of the operating module or modules at the computer. Signal communication between the operating module and the arithmetic and logic unit of the computer takes place via the data interface or interfaces of the computer, which may be designed for wired or wireless communication with the operating module or modules. Preferably, bidirectional communication is provided between the computer and the operating module, so that signals from the external components arriving at the operating module may be provided over the signal path to the arithmetic and logic unit in the computer, and the behaviour of the external components may be influenced by corresponding signals from the arithmetic and logic unit to the processing device. Alternatively, unidirectional communication may also be provided between a operating module and the computer. For example, unidirectional communication to the computer via the operating module may be provided from an external component in the form of a sensor. Similarly, unidirectional communication may be provided from the computer via the operating module to an actuator. The actuator may also be provided with a sensor which is in communication with the computer via another operating module.

Advantageous developments of the invention are the subject of the dependent claims.

It is expedient if the arithmetic and logic unit is so configured as to provide on a screen field adjacent to the working position of the operating module a graphical representation assigned to the operating module and/or that the arithmetic and logic unit is so configured, with the aid of the graphical representation assigned to the operating module, as to symbolise on the screen an electrical and/or fluidic function of the operating module. The graphical representation of the operating module on the screen field of the computer located adjacent to the operating module serves to visualise a function and/or a functional state of the operating module concerned. By this means the user is shown, in a readily understandable way, what are the options offered by the operating module concerned and the external components connected to it for use in an automation system, and/or in what state the operating module and/or the external components are at present. It is also possible to provide that in the screen field, through selection of the graphical representation by the user, for example a help function and/or a parameter setting function and/or other functions for the operating module and/or the connected external components may be called up, in order for example to influence the driving of the external components. The operating module may be assigned different functions which are displayed on the relevant screen field of the computer and which form the basis for the processing of the signals of the external components provided at the operating module. For example it may be provided that the user, before connection of external components to the operating module, firstly selects from a function library the desired functionality for the operating module and assigns it to the operating module, so that subsequently the desired processing of the signals of the external components in the operating module and the computer is also ensured.

In a further variant of the invention it is provided that the arithmetic and logic unit is configured so as to provide, in the graphical representation on the screen assigned to the operating module, information which depends on electrical signals of the computer and/or the external components to the operating module. By this means, in a simple manner, a measured value supplied by the external component and/or a signal provided by the computer to the external component, for example a control signal for a valve, may be visualised. A state of the external component, for example a switching state of a fluidic valve or a movement position of an actuator, may be shown on the screen. For this purpose an electrical signal provided in the computer by the external component via the operating module, or an electrical signal provided by the arithmetic and logic unit of the computer is processed and displayed in the relevant screen field.

It is advantageous if the arithmetic and logic unit is configured for a virtual electrical and/or virtual fluidic interlinking of several operating modules. By this means it is possible to model on the computer complex devices provided with presettable dependencies, which may be operated concretely using the operating modules and the external components connected to them. For example an operating process of an electrical actuator or a switching operation of a fluidic valve may be generated. On account of the virtual linkages between the individual operating modules it is possible in a simple manner and without the need for changes to wiring and/or fluidic connections, to obtain a change in the automation system which is formed by the training unit and the external components connected thereto. By this means it is possible to change in a simple manner both virtual electrical linkages, for example between a movement sensor and an electrical actuator, and also virtual fluidic linkages, for example between a fluidic end position switch on a fluidic actuator and a check valve assigned to the fluidic actuator. Alternatively it is also possible to provide for real control components, for example components of a programmable logic controller, to be connected to one or more operating modules, and to provide control signals to the operating modules which are processed by the arithmetic and logic unit and may be used to drive a virtual processing system or a virtual manipulator which is shown on the screen of the computer. Mixed forms between these two types of application are also possible.

Preferably looped in to the signal path is a communication unit, which is designed for unidirectional or bidirectional conversion of electrical signals between operating module and computer. The communication unit is provided for the purpose of transferring the electrical signals of the operating modules into a data format which can be transmitted via the data interface into the arithmetic and logic unit of the computer. The communication unit therefore serves for the processing of the signals supplied by the operating modules, and also where applicable for the provision of suitable signals to the operating modules. Preferably the communication unit includes a separate processor on which can run a program which makes possible the processing of a multiplicity of different signals from different operating modules and an orderly onward transmission of the signals in a presettable data format. In this connection it may be provided for the communication unit to carry out pre-processing of signals of the operating modules, for example an analog-digital conversion and/or a level conversion of signal levels, in order to ensure advantageous communication over the data interface of the computer. This is of particular importance when the computer is a conventional computer for home or office applications and is not provided with special data interfaces such as those used in the field of automation systems, for example a field bus interface. Through these measures it is possible to keep the operating modules simple and cost-effective, since the signal processing is effected centrally in the communication unit. Moreover, use of an inexpensive computer is also made possible in this way.

In a different embodiment of the invention, the computer and the communication unit are accommodated in a common housing. For example the computer is specially adapted for training and or testing purposes and has an integral communication unit.

Preferably the communication unit is designed for a mechanical connection, in particular by means of a magnetic coupling and/or a physical plug connection, with the operating module. The communication unit therefore ensures a physical arrangement of the operating modules which is substantially independent of the computer. When a physical plug connection is used it is also possible, in a dual function, to obtain electrical signal transmission between operating module and communication unit.

It is expedient if electrical connection means, corresponding to one another, in particular non-contact and or requiring contact, are formed on the operating module and the communication unit, and are configured for signal transmission between operating module and communication unit. The electrical connection means serve for unidirectional or bidirectional signal transmission between the operating module and the communication unit. The electrical connection means may be in particular in the form of multiple plug connectors or wireless connection means, in particular compliant with the Bluetooth, IRDA or Zigbee standards.

In a further variant of the invention, the computer and/or the communication unit are configured for recognition of the connected operating module and for provision of specific data associated with the recognised operating module, from an internal or external database. This facilitates start-up of the automation system formed by the automation unit and the external components connected to it. Preferably the operating module concerned has an information store which carries information regarding the function of the operating module, and which may be retrieved and read out by the communication unit and/or the computer. The information store may be for example an RFID transponder module (Radio Frequency Identification Module) or a memory of a microprocessor or microcontroller which is possible necessary in any case for the functioning of the operating module. Depending on the technology of the information store it may be read out by wire-dependent or wireless means, in order by this means to allow the communication unit and/or the computer to identify the operating module. The information about the relevant operating module needed for orderly signal evaluation in the computer and for graphical representation of the operating module on the screen field may be read out from an internal database, i.e. either from the information store of the operating module or from a memory of the communication unit or the computer. In addition or alternatively it may be provided for the communication unit and/or the computer to access, by a wired connection or by wireless means, in particular over a wireless local network (WLAN), an external database, in particular a server-based database, which may be called up over the internet or over a local network (LAN), and to retrieve data concerning the operating module from this database. Preferably the communication unit and/or the computer are configured for uninterrupted operation during the exchange of one or more operating modules, i.e. they have technical program facilities which allow the addition, removal or replacement of one or more operating modules, without the need for a restart of the communication unit and/or the computer for continuing functioning of the automation unit.

Preferably the operating module has a tongue-like extension, in particular interchangeable and which, on physical connection of the operating module to the computer, in particular by means of the communication unit, covers a boundary zone of the computer housing formed around the screen. The tongue-like extension serves to mark the relationship of the respective operating module to the graphical representation, on the screen field to which the respective operating module is assigned, in a manner which is readily comprehensible to the user. Preferably it is provided that, on that outer surface of the operating module bordered by the extension and/or on the extension, at least one graphical symbol and/or a symbolic line is/are shown and continued on the adjoining screen field, in order to mark by this means a continuous relationship between the connected external components, the operating module and the graphical representation on the screen field. Preferably the extension may be clipped on to the operating module, to facilitate fitting to differently shaped computer housings.

In a development of the invention it is provided that the processing unit includes an electrical sensor unit and/or a fluidic sensor unit and/or an electro-fluidic control unit and/or an electrical control unit and/or a bus node. When the processing unit is designed as an electrical or fluidic sensor unit, it is possible for example to carry out current or voltage measurement for electrical current or a flow measurement or pressure measurement for a fluid flow. An embodiment of the processing unit as an electro-fluidic control unit may for example comprise a solenoid valve, in particular a switching valve or a proportional valve. An embodiment of the processing unit as an electrical control unit may for example comprise a motor control for an electric motor. A processing unit designed as a bus node facilitates decoupling of bus signals from a bus system and/or coupling of bus signals into the bus system, in order by this means to facilitate communication between the bus system and the automation unit by means of the suitably designed operating module.

Preferably the external component is in the form of a sensor or actuator or programmed controller. For example the external component is in the form of a pressure sensor, temperature sensor, position sensor, speed sensor or part of a programmable logic controller. When the external component is in the form of an actuator, this may be for example a fluid cylinder, a fluid motor, a piezoelectric actuator or an electric motor. If the external component is in the form of a programmable controller, in particular a programmable logic controller (SPS), then command sequences may be provided to the automation unit and there supplied to a virtual system, for example to a virtual pneumatic automation system or to a virtual industrial robot or to a virtual process system, so that the effects of the external component on the virtual system concerned may be displayed on the screen of the computer.

It is advantageous for the computer housing with the integral screen to have a substantially cubical envelope geometry and/or for the screen to be touch-sensitive for manual input on a screen surface. Such an envelope geometry ensures a compact design of the automation unit, which applies especially when the surface extent of the computer housing in the display plane of the screen is only slightly greater than the screen itself and when the thickness of the computer housing is a fraction less than $\frac{1}{10}$ of the longest edge of the computer housing in the screen plane.

The problem of the invention according to a second aspect is solved by a method for the virtual functional interlinking of external components such as actuators and/or sensors and/or bus participants and/or control components, which comprises the following steps: connection of the external components to operating modules which are designed for the processing and/or provision of signals and/or for the influencing of fluid flows from the external components and/or to the external components, connection of the operating modules to a computer, in particular with interconnection of a communication unit, wherein the operating modules are arranged adjacent to a screen of the computer, carrying out recognition of the operating modules connected to the computer, readout of data for a graphical representation of the operating modules on the screen from an internal or external database, display of the graphical representations of the operating modules in screen fields adjacent to the respective operating modules, display of interlinking options for connections between the connected operating modules. At the same time the operating module may be assigned in each case several graphical representations and linked functionalities for the processing of signals from external components, which may be selected by the user.

In a further variant of the method it is provided that the the computer generates signal paths between operating modules in accordance with an automated or manual interlinking selection, so that an exchange of signals between the virtual functional interlinked operating modules takes place, in order to generate a behaviour of the operating modules and the external components connected to them which preferably corresponds to a direct connection of the external components.

According to a third aspect the problem of the invention is solved by a computer program product for the virtual functional interlinking of external components, wherein through the running of the computer program product by an arithmetic and logic unit of a computer, the method according to claim 13 or 14 is implemented.

BRIEF DESCRIPTION OF THE DRAWINGS

An advantageous embodiment of the invention is represented in the drawing, showing in.

DETAILED DESCRIPTION OF THE PREFERRED EMBODIMENTS

Figure 1:
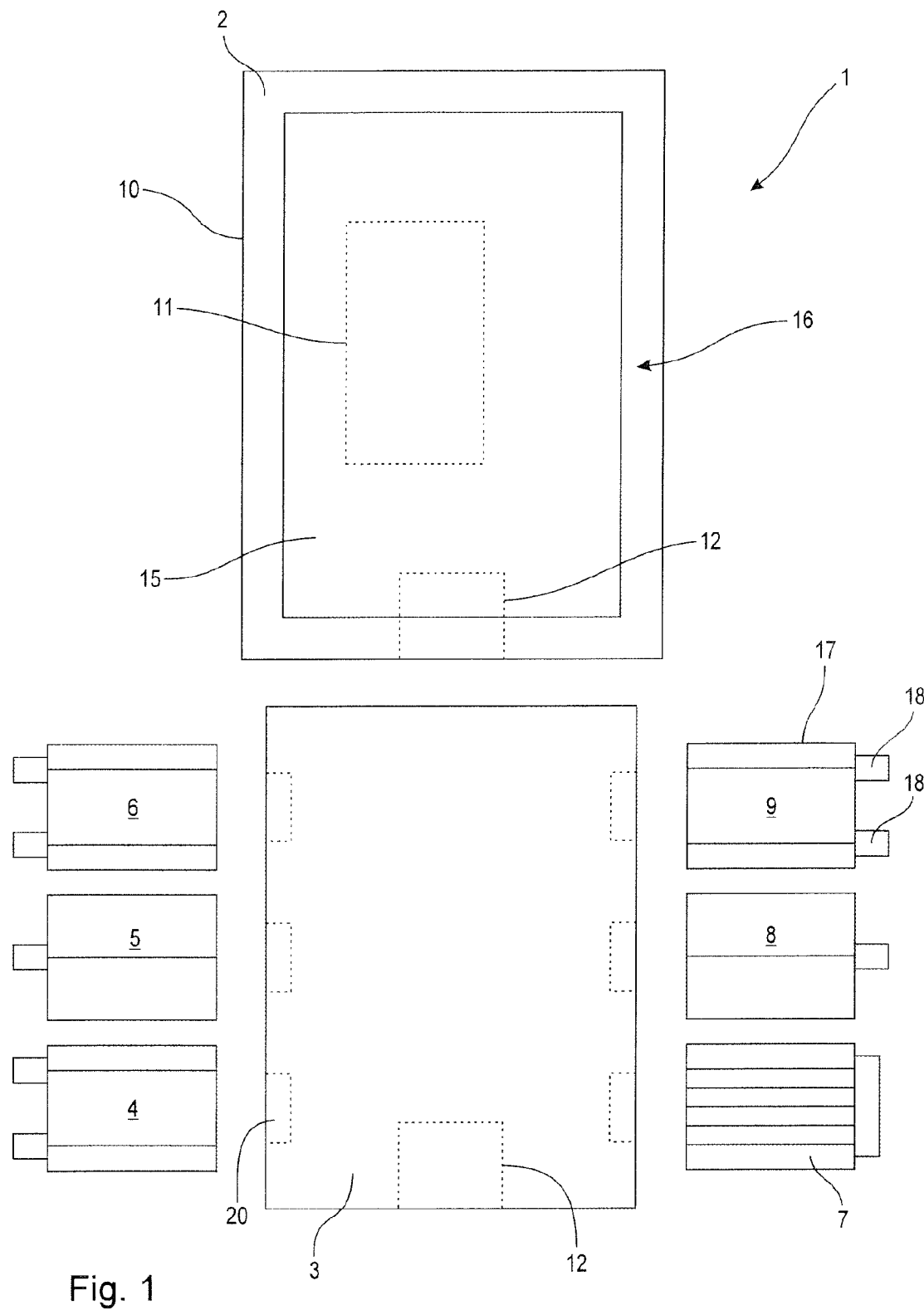
FIG. 1 a schematic exploded view of key components of an automation unit, seen from above FIG. 2 a front view of the components of the automation unit FIG. 3 a schematic view of an automation system ready for use and including the automation unit together with several external components FIG. 4 a front view of the automation system ready for use, and FIG. 5 a schematic view of an operating module, by way of example in the form of a 2/2-way solenoid valve.

An automation unit 1 for training purposes shown in FIG. 1 in an exploded view comprises a computer 2, a communication unit 3, and also several functionally different operating modules 4, 5, 6, 7, 8 and 9.

The computer 2 is by way of example in the form of a tablet PC, i.e. it has a computer housing 10 which may be surrounded substantially by a cubical envelope, in which are accommodated an arithmetic and logic unit 11, shown only schematically, a data interface 12 likewise shown only in schematic form, and a screen 15. Here the screen 15 is so accommodated in the computer housing 10 that it at least almost completely fills a maximum outer surface 16 of the computer housing 10. Because of this, only a narrow boundary zone is left between an outer edge of the screen 15 and an outer edge of the computer housing 10. Preferably the screen 15 is designed to be touch-sensitive, so that a user may make inputs to the computer 2 by manual activation of the screen surface. The arithmetic and logic unit 11 is configured to provide a screen display and to process signals which are provided for example as screen inputs or over the data interface 12. Preferably the arithmetic and logic unit 11 is operated by an interchangeable operating system into which a program code specially geared to operation of the automation unit may be loaded. As may be seen from FIGS. 1 and 2, the thickness of the computer housing 10 discernible in FIG. 2 is considerably less than a longest edge of the computer housing 10 discernible in FIG. 1.

The operating modules 4 to 9 associated with the automation unit 1 comprise in each case a module casing 17, by way of example substantially cubic in form, on which is formed a connection device 18 for electrical and/or fluidic connection with an external component not shown in FIG. 2. Also formed on the module casing 17 is a plug 19, which serves for electro-mechanical connection with a socket 20 formed on the communication unit 3. Consequently, signal communication may be established between the respective operating modules 4 to 9, the communication unit 3 and the arithmetic and logic unit 11, running for example via a wired signal path from the respective operating module 4 to 9 to the communication unit 3, and from there for example via a wireless connection between the communication unit 3 and the arithmetic and logic unit 11 over the data interface 12. By way of example the data interface 12 is in the form of a Bluetooth interface. In an embodiment which is not shown, the communication unit is integral with the computer.

Figure 3:
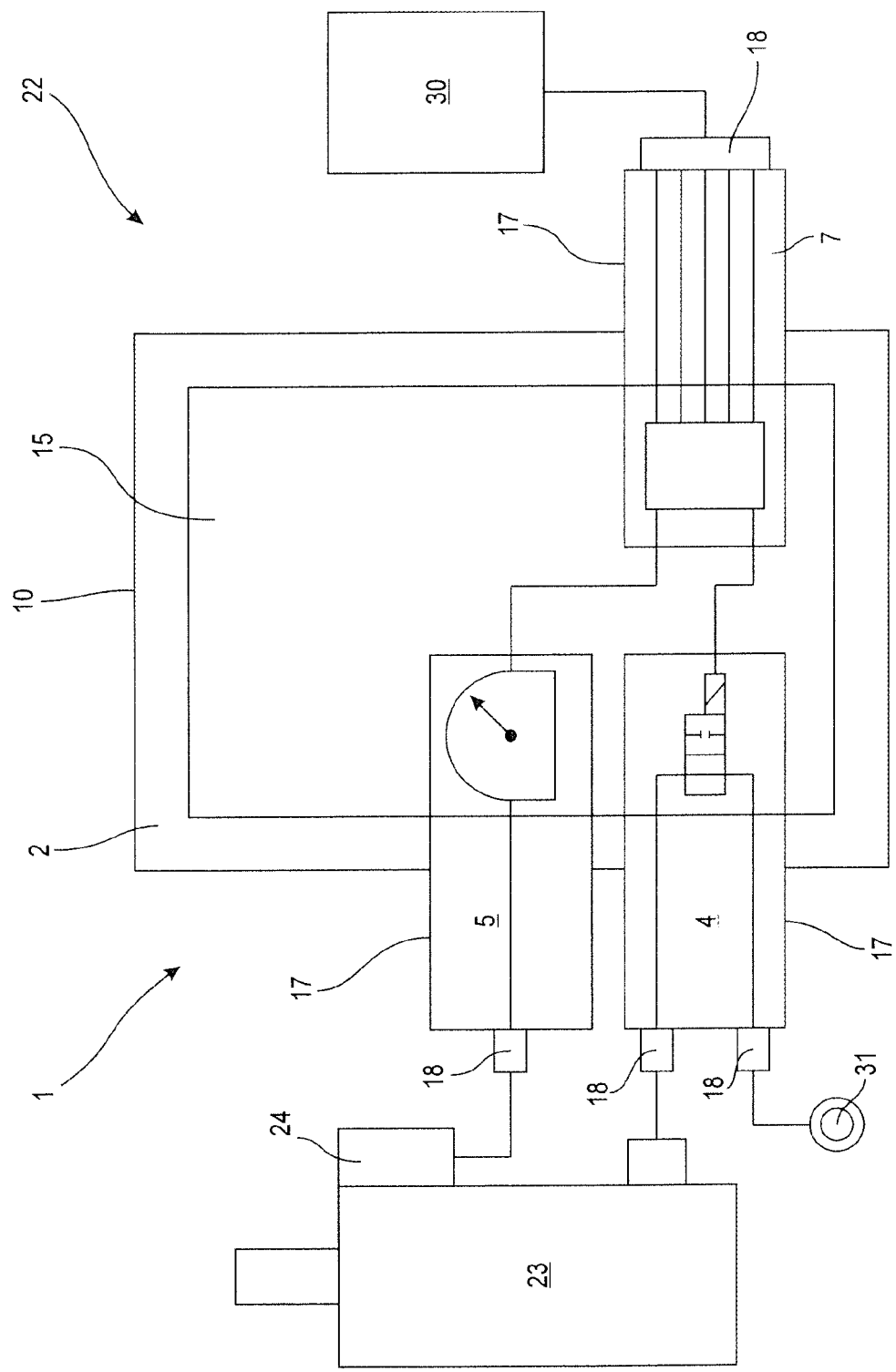

Each of the operating modules 4 to 9 has an extension 21 which is provided for the purpose of bridging the boundary zone at the computer housing 10, so that a direct connection may be made between the operating module 4 to 9 and a graphical representation on the screen 15, as shown in detail in FIG. 3.

The automation system 22 shown in FIG. 3 comprises, besides the automation unit 1 which for the sake of simplicity is provided with only three operating modules 4, 5 and 7, several external components. By way of example the external components are in the form of a fluid motor 23, a speed sensor 24, and a control unit 30. The operating module 4 comprises by way of example a 2/2-way switching valve 28, and is shown in detail in FIG. 5.

According to FIG. 5, a processing unit 26 comprising the 2/2-way switching valve and a coupling module 27, is provided in the module casing 17 of operating module 5. The 2/2-way switching valve has a fluidic connection with the connection device 18, at which fluid hoses for connection with the fluid motor 23 and with a fluid source 31 may be connected. The coupling module 27 comprises by way of example a microcontroller, not shown in detail, together with an amplifier module, also not shown in detail. The microcontroller serves for the processing of signals which are provided by the communication unit 3, and with the aid of the amplifier module 27, suitable signals are converted into activation signals to active the solenoid of the 2/2-way switching valve. The coupling module 27 is connected to the plug 19, in a manner not shown in detail, over which both coupling in and out of electrical signals, also electrical supply voltages, may be effected.

The operating module 4, via the plug and socket connection of plug 19 and socket 20, is in electrically conductive, wired signal transmission connection with the communication unit 3, which in turn, over the data interface 12, is in wireless signal transmission connection with the arithmetic and logic unit 11 of the computer 2. Activation of the 2/2-way switching valve 28 accommodated in operating module 4 is effected for example through a control unit 30, which is connected via operating module 7 with the communication unit 3 and the computer 2. The control unit 30, by way of example in the form of a bus participant, receives the signal of the speed sensor 24 connected to operating module 5 via a bus system, shown only in schematic form, between the operating module 7 and the control unit 30, and processes this signal in order to verify agreement between the measured speed and a presettable speed range for the fluid motor 23. In the event of deviations which exceed a presettable threshold, the control unit 30 outputs a control signal, via the bus system, to operating module 7. This control signal is passed on via the communication unit 3 and the computer 2 to operating module 4, leading to a switching movement of the 2/2-way switching valve 28, through which the fluid supply to the fluid motor 23 may be varied.

To build up the automation system 22 shown by way of example in FIG. 3, the following procedure may be provided. Firstly, the computer 2 is fitted on to the communication unit 3. For this purpose, if necessary, holding means not shown in detail may be provided, to ensure that the computer 2 and communication unit 3 are firmly held together. The operating modules 4, 5 and 7 are then connected to the communication unit 3, with the option of connecting each of the operating modules 4, 5 and 7 to the communication unit 3 in any desired operating position relative to the computer 2, i.e. at a freely selectable point with a socket 20. By way of example the communication unit 3 determines the information needed by the computer 2 in order to process the signals for the respective operating modules 4, 5 and 7. For this purpose the communication unit 3 communicates with the operating modules 4, 5 and 7 and retrieves the relevant function and/or identification. In a subsequent step, the communication unit 3 makes the information found available to the computer 2 which, on the basis of a program running in the arithmetic and logic unit 11, determines a data set or a library of data sets for the operating modules 4, 5 and 7 and where applicable makes these available to the user for selection. For example the data sets are determined from an external database, which may be interrogated for example over a wireless internet connection between the computer 2 and an Internet access point, not shown, or via a local network (LAN/WLAN) of a local server.

As soon as the data sets for the operating modules 4, 5 and 7 are available in the arithmetic and logic unit and, where applicable, the user has selected a suitable data set from different data sets, the arithmetic and logic unit is able to make for each of the operating modules 4, 5 and 7 in a screen field adjoining the respective operating module 4, 5 and 7 a graphical representation on the screen 15, representing a function dependent on the data set, in particular on the selected data set and where applicable a corresponding functional state of the respective operating module 4, 5 and 7. It is also possible to display in the screen field concerned in what way a relationship exists between the represented functionality of the respective operating module 4, 5 and 7 and the operating module 4, 5 and 7. For this purpose, function symbols applied for example to the operating modules 4, 5 and 7, such as for example line symbols representing electric or fluid lines, are continued on the screen 15. Preferably the function of the respective operating module 4 to 9 is shown on the screen 15, by way of example in the case of operating module 4 the valve function as a 2/2-way switching valve.

In addition or alternatively it may be provided for the function of the external component connected to the operating module 4 to 9 to be shown on the relevant screen field. So for example, for operating module 5, the function of the speed sensor 24 is displayed on the screen 15. For this purpose it may be necessary to inform the computer 2 which external component is connected to the operating module 5.

For example the data set for operating module 5, which the computer 2 determines with the aid of the identification of operating module 5, may be so designed that the program running in the arithmetic and logic unit 11 recognizes that an additional input is needed in order to make the correct graphical representation of the operating module 5 on the screen 15. For example the user may be called upon to input a type code for the speed sensor 24.

As soon as the respective operating modules 4, 5 and 7 are represented on the relevant assigned screen fields, the computer 2 can request the user for an input in order to make the desired linkages between the operating modules 4, 5 and 7. Here it may be provided for example, depending on the selected didactic concept, to allow the creation only of technically sensible linkages between the operating modules 4, 5 and 7. The desired linkages may for example be prepared by the user, by manually drawing on the touch-sensitive screen surface a line between the operating modules 4, 5 and 7 to be linked. By this means the computer 2, in accordance with the running program, shows a line on the screen 15 between the screen fields of the operating modules 4, 5 and 7, and also executes a logical interlinking of the operating modules 4, 5 and 7 in the arithmetic and logic unit 11.

By way of example, altogether two linkages have been made in the automation system according to FIG. 3. The first linkage relates to a signal transmission from the speed sensor 24 to the control unit 30. The second linkage concerns a signal transmission from the control unit 30 to the 2/2-way switching valve 28.

Deviating from the depiction of FIG. 3, other virtual components may additionally be inserted in the signal paths shown on the screen 15, between the operating modules 4, 5 and 7. This may involve for example, in the case of the connection of two operating modules with respectively connected fluidic components, a restrictor, a valve or another virtual fluidic component.

Through the use of operating modules it is possible to connect commonly used electrical and fluidic components to the automation unit 1, while the selection of these components is limited only by the design of the respective operating modules required for connection to the computer 2. On account of the modular design of the automation unit 1, these may easily be interchanged.

In a further manner of use, not shown in detail, of the automation unit 1 a controller, in particular a programmable logic controller, is connected to at least one operating module, and the control signals of the controller serve as input signals for the respective operating module. It is then possible to show on the screen of the computer for example a virtual industrial robot or a virtual technical process system which is to be driven by the controller so that, after suitable programming of the controller, the correct functioning of the industrial robot or the system may be checked safely on the computer screen.

The invention claimed is:

1. An automation unit for training purposes comprising: a computer comprising an arithmetic and logic processor, a computer housing, a data interface and a screen, wherein the arithmetic and logic processor, the data interface and the screen are accommodated in the computer housing;
at least one operating module including a module casing, the module casing comprising a connection device, for electrical and/or fluidic connection to an external component, and a microcontroller, for processing of electrical signals of the computer and/or the external component, wherein the at least one operating module is designed for location in a working position adjacent to the screen and for signal communication with the arithmetic and logic processor via a wireless and/or wired signal path which runs over the data interface, and wherein the arithmetic and logic processor is so configured as to provide on a screen field adjacent to the working position of the at least one operating module a graphical representation assigned to the at least one operating module; and
a communication unit looped into the signal path, the communication unit adapted for unidirectional or bidirectional conversion of electrical signals between the at least one operating module and the computer.

2. An automation unit according to claim 1, wherein the arithmetic and logic processor is so configured, with the aid of the graphical representation assigned to the at least one operating module, as to symbolize on the screen an electrical and/or fluidic function of the at least one operating module, and/or wherein the arithmetic and logic processor is configured so as to provide, in the graphical representation on the screen assigned to the at least one operating module, information which depends on electrical signals of the computer and/or the external component to the at least one operating module.

3. An automation unit according to claim 1, wherein the arithmetic and logic processor is configured for a virtual electrical and/or virtual fluidic interlinking of several operating modules.

4. An automation unit according to claim 1, wherein the communication unit is designed for a mechanical connection with the at least one operating module.

5. An automation unit according to claim 4, wherein the communication unit comprises a socket and the at least one operating module comprises a plug received within the socket of the communication unit for signal transmission between the at least one operating module and the communication unit.

6. An automation unit according to claim 4, wherein the computer and/or the communication unit are configured for recognition of the at least one operating module and for provision of specific data associated with the at least one operating module, from an internal or external database.

7. An automation unit according to claim 1, wherein the at least one operating module has a tongue-like extension, the tongue-like extension covering a boundary zone of the computer housing formed around the screen upon physical connection of the at least one operating module to the computer.

8. An automation unit according to claim 1, wherein the microcontroller includes an electrical sensor unit and/or a fluidic sensor unit and/or an electro-fluidic control unit and/or an electrical control unit and/or a bus node.

9. An automation unit according to claim 1, wherein the external component is in the form of a sensor or actuator or programmed controller.

10. An automation unit according to claim 1, wherein the computer housing with the screen has a substantially cubical envelope geometry and/or the screen is touch-sensitive for manual input on a screen surface.

11. A method for the virtual functional interlinking of external components, the method comprising:

connecting the external components to operating modules which are designed for the processing and/or provision of signals and/or for the influencing of fluid flows from the external components and/or to the external components;

connecting the operating modules to a computer, wherein the operating modules are arranged adjacent to a screen of the computer;

carrying out recognition of the operating modules connected to the computer;

reading out data for a graphical representation of the operating modules on the screen from an internal or external database;

displaying the graphical representations of the operating modules in screen fields adjacent to the working position of the respective operating modules; and displaying interlinking options for connections between the connected operating modules, wherein the computer generates signal paths between the operating modules in accordance with an automated or manual interlinking selection, so that an exchange of signals between the virtual functional interlinked operating modules takes place, in order to generate a behavior of the operating modules and the external components connected to the operating modules which corresponds to a direct connection of the external components.

* * * * *